United States Patent [19]

Landt et al.

[11] Patent Number: 5,098,337
[45] Date of Patent: Mar. 24, 1992

[54] METHOD AND APPARATUS FOR DETACHING MEAT FROM POULTRY BODIES

[75] Inventors: Andreas Landt, Lübeck; Wolfgang Wagner, Reinfeld, both of Fed. Rep. of Germany

[73] Assignee: Nordischer Maschinenbau Rud.Baader GmbH +CO KG, Lubeck, Fed. Rep. of Germany

[21] Appl. No.: 618,492

[22] Filed: Nov. 27, 1990

[30] Foreign Application Priority Data

Nov. 29, 1989 [DE] Fed. Rep. of Germany ....... 3939340

[51] Int. Cl.⁵ .................................................. A22C 4/13
[52] U.S. Cl. ...................................... 452/136; 452/135
[58] Field of Search ............... 452/136, 135, 127, 125, 452/137, 138

[56] References Cited

U.S. PATENT DOCUMENTS

| | | | |
|---|---|---|---|
| 4,557,017 | 12/1985 | Gasbarro | 452/136 |
| 4,648,156 | 3/1987 | Meyn | 452/136 |
| 4,682,386 | 7/1987 | Hazenbroek et al. | 452/136 |
| 4,682,558 | 9/1989 | Langen et al. | 452/138 |
| 4,951,354 | 8/1990 | Callsen et al. | 452/136 |
| 4,993,114 | 2/1991 | Meyer et al. | 452/136 |

Primary Examiner—Bruce M. Kisliuk
Assistant Examiner—Lawrence Cruz
Attorney, Agent, or Firm—Fay, Sharpe, Beall, Fagan, Minnich & McKee

[57] ABSTRACT

A method and an apparatus for detaching the meat from poultry bodies in the form of fillets have the object to also gain the meat which lies on the ribs in the region of the back when processing "front-halves". This is done by scraping blades which, to this end, are controlled by the contour of the skeleton and which are designed with a hollow shape and have a cutting edge directed counter to the advancing direction of the skeleton.

8 Claims, 1 Drawing Sheet

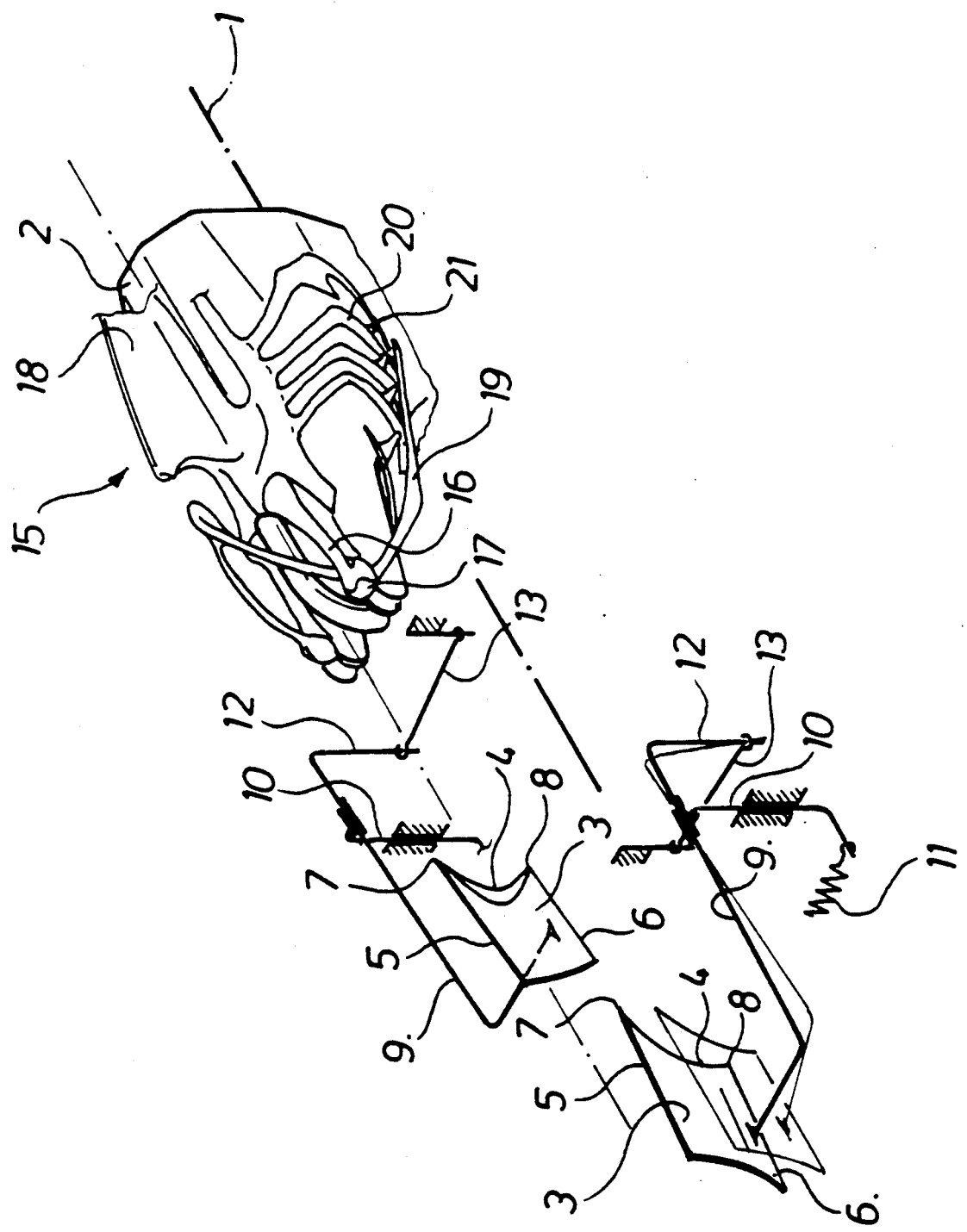

METHOD AND APPARATUS FOR DETACHING MEAT FROM POULTRY BODIES

BACKGROUND OF THE INVENTION

1. Field of the Invention

The invention relates to a method for mechanically detaching fillet-shaped meat from poultry bodies, which have been prepared as "front-halves" and from which the wings and the skin have been removed, by means of a scraping action, as well as to an apparatus for carrying out such method, the apparatus comprising conveying means driven to revolve and having saddle-shaped receptacles for conveying the pieces to be processed with the breast facing upwardly and with the neck leading, and controllable scraping blades, which are arranged at both sides of the path defined by the receptacles, have a dish-shaped profile and face the path of said receptacles with their concave sides.

2. Related Art

From U.S. Pat. No. 4 557 017 there is known an apparatus for gaining the breast meat of breast sections of poultry bodies, which are fixed on a saddle-shaped conveyor with the breast facing upwardly and are conveyed through the operative region of a series of processing tools. Initially, the breast meat is severed by means of two knife blades at both sides of the breastbone, and then it is stripped off from the skeleton portions lying thereunder starting from the incisions made by the knife blades. The stripping off is performed by stripping elements which are arranged to be inclined with regard to the path of the conveyor, which elements are provided with stripping edges made of flexible material.

Furthermore, there is known a filleting device from EP 1 68 865, in which the fillet meat is pushed off from the poultry bodies by means of tools starting from the rib portions towards the breastbone, these tools being arranged along the lower run of a conveyor equipped with saddles for fixing the poultry bodies. After incisions have been made in the meat of the back along both sides of the backbone, and the head of the wishbone (clavicula) has been removed, the wishbone branches which have remained on the carcass are scraped free by means of a panel or screen, whereafter the fillet meat is pushed off up to the vicinity of the ridge of the breastbone by means of strippers. Then, the meat is detached in the transitional area towards the breastbone and from the flanks thereof, and it is finally scraped off from the ridge of the breastbone, which actions occur by means of stripping fingers.

Finally, a device having the above structure is disclosed by U.S. Pat. No. 4 682 386 in which, for the purpose of gaining meat, poultry bodies fixed on saddles and conveyed with their breastbone facing upwardly are processed in the lower run of a conveyor. In this processing the meat is initially severed from the skeleton in the region of the ribs by means of stationary blades, whereupon the shoving off of the meat from the wishbone is performed by severing the wing tendons through wingshaped blades which are arranged to be controlled to move into the path of the poultry bodies and to remain there stationary as well. Finally, plates which form a tunnel in their operative positions cause the meat to be stripped off from the skeleton up to the breastbone. The complete severing is performed by a fork-shaped fillet stripper, which strips off the fillet from the flanks of the breastbone in the form of a double fillet.

By means of the cited known devices it is possible, in general, to gain the meat of poultry bodies in the form of single or double fillets mechanically. However, when regarding and rating this under aspects of quality and quantity, it has to be appreciated that the result of such processing is not satisfactory. The reason for this is that the surface of the fillet severed from the skeleton of the poultry body is particularly rough and rugged in those portions which were situated in the region of the ribs. The reason for this is that hitherto the gaining of the meat portions situated in the region of the shoulder blades has never been an immediate object, which resulted in that the meat which had been detached from the skeleton otherwise was torn off in an undefined manner in this region.

OBJECTS OF THE INVENTION

It is the main object of the invention to gain fillet meat from poultry bodies in an improved manner to achieve higher quality and quantity in yield.

It is a particular object of the present invention to gain meat portions which are situated on the ribs in the region of their connection to the backbone or on the shoulder blades partially covering the ribs.

SUMMARY OF THE INVENTION

In a method for processing poultry by mechanically detaching fillet-shaped meat from poultry bodies, which have been prepared as "front-halves" and from which the wings and the skin have been removed, by means of a scraping action through controllable scraping means which are guided on the poultry body during the scraping action, these objects are achieved in that the scraping means engage the shoulder blades (scapulae) at the beginning of the scraping action and are guided by the shoulder blades.

In an apparatus for performing such mechanical detaching by a scraping action, which apparatus comprises revolving conveying means having saddle-shaped receptacles for conveying the meat pieces to be processed, and scraping blades for performing such scraping action, which are arranged at both sides of the conveying path, have concave or dish-shaped profiles, face the path of the receptacles with their concavities, and are arranged to be controlled, these objects are achieved each of the scraping blades with a dove-tailed cutting edge directed counter to the direction of movement of the conveyor and is mounted to be moved in a manner that it can be guided from a rest position in the area of the central plane of the path of the receptacles along the skeleton's contour defined by the ribs and the shoulder blade (scapula).

The advantages thus achieved particularly reside in that the tools which detach or lift-off the meat in the region of the ribs are guided by the shoulder blades. Due to the dove-tailed structure of the scraping blades it is safeguarded that a scraping component is created which is directed or aligned essentially in the longitudinal direction of the ribs, so that the danger of the blades moving underneath the ribs is avoided even though the scraping blades are pressed against the ribs.

The exertion of pressure on the scraping blades can be achieved by means of spring force, the controlling of the scraping blades according to the skeleton contour occurring through the skeleton itself.

An optimum scraping or peeling process can be achieved if each scraping blade during its guided movement along the contour of the skeleton is always aligned such that it extends essentially tangential to the skeleton with regard to the respective working point or operative position of the cutting edge.

BRIEF DESCRIPTION OF THE DRAWINGS

Other and further objects of the present invention will be apparent from the following description and claims and are illustrated in the accompanying drawing which by way of illustration schematically shows a preferred embodiment of the present invention and the principles thereof and what now is considered to be the best mode contemplated for applying these principles. Other embodiments of the invention embodying the same or equivalent principles may be used and structural changes may be made as desired by those skilled in the art without departing from the present invention and the scope of the appended claims.

In the single Figure of the drawing there is shown in a simplified axonometric representation an apparatus designed according to the invention for gaining the nonshown meat portions lying on the ribs in the area of the connection of the ribs to the backbone or on the shoulder blades partially covering them.

DETAILED DESCRIPTION OF THE DRAWING

A device according to the present invention is mounted in a non-shown frame of a poultry filleting machine, which serves also for gaining the meat lying on the remainder of the skeleton of poultry bodies, in the form of fillets. This apparatus essentially comprises a conveyor 1 defining a conveying path for conveying poultry bodies and carrying receptacles 2 for receiving such poultry bodies. One scraping blade 3 is arranged at either side of the path of conveyor 1. Each of these scraping blades 3 has a hollow or dish-shaped profile in the direction of movement of the receptacles 2, with its hollow or concave side facing the path of the receptacles 2. The front portion of the scraping blade 3, which is directed counter to the direction of movement of the receptacles, is designed with a dove-tail-shaped cutting edge 4 which is chamfered inwardly, tips or points 7 and 8 being formed in the region of the upper and lower edges 5 and 6, respectively. The tip 8 of the lower edge 6 is arranged in a backwardly offset position relative to the tip 7 of the upper edge 5. Each scraping blade 3 is attached to one end of a carrier arm 9, which is designed as a two-armed lever and is mounted to swivel horizontally and outwardly against the force of a spring 11 about a vertical axis 10 arranged outside the path of the receptacles 2. In addition, the carrier arm 9 is mounted to pivot about its longitudinal axis. The other end of the carrier arm 9 is provided with a downwardly directed lever portion 12 whose free end is engaged by a guide rod 13, whose other end is mounted to a fixed portion of the machine frame.

The function of the apparatus is explained in the following by way of the passage of a poultry body 15. This has been prepared as a so-called "front-half", i.e. it represents the portion of a poultry body which is produced by a cut extending through the body obliquely and severing the pelvis together with the legs. From the body portion thus obtained the wings and the skin have also been removed. This "front-half" is clapped or shoved onto the receptacle 2 of the conveyor 1 such that the body joints 17 of the coracoids (coracoidae) 16 carrying the wings face in the conveying direction, whereas the breastbone (sternum) 18 faces upwardly. The poultry body 15 aligned in this manner is now fixed by means e.g. described in German Patent 36 32 187 and is conveyed towards the scraping blades 3. Each one of these is set such that, in its basic position, it penetrates into the meat with its leading upper tip 7 immediately below the corresponding body joint 17 and in the plane of the outer flank of the shoulder blade (scapula) 19 which continues the skeleton downwardly in this region. In the further course of advancing, the shoulder blade 19 first controls the scraping blade 3 due to the fact that the dove-tail-shaped cutting edge 4 slides downwardly along the shoulder blade. During this action the scraping blade 3 is displaced outwardly which displacement leads to a downward displacement of the scraping blade 3 due to the mounting and articulation of the carrier arm 9, as well as to a simultaneous tilting about the longitudinal axis of the scraping blade. The lower portion of the scraping blade 3, which includes the tip 8, thus passes over the part of the ribs 20 following the backbone in the region of the hook appendages 21 connecting the ribs and detaches the meat lying on the skeleton in this region by a scraping step which creates a scraping component extending essentially along the ribs 20 due to the dove-tail-shaped design of the cutting edge 4. In this stage of the scraping process the scraping blade 3 is controlled by the contour by engaging the ribs 20.

After the detaching of these meat portions, the filleting may be completed in a known manner so that, depending on the specific processing method, a double fillet or two individual fillets may be gained having a meat yield which is increased and thus improved by the back meat portions when compared with fillets obtained by hitherto known methods.

What is claimed is:

1. A method for processing a poultry body, comprising the steps of:
presenting a poultry body to a means for detaching meat therefrom, said means including a scraping edge;
guidedly engaging said scraping edge with the poultry body along a shoulder blade between the shoulder blade and a meat portion adjacent the shoulder blade;
advancing the poultry body relative to the scraping blade so that the scraping blade is guided along the shoulder blade; and
detaching the meat portion from the shoulder blade by the scraping blade being guided along the shoulder blade under positive contacting control of the scraping blade by the shoulder blade.

2. An apparatus for detaching a meat portion from a poultry body, comprising:
conveying means for conveying a poultry body along a conveyor path; and
first scraping means arranged along the conveyor path for detaching a meta portion from a shoulder blade of the poultry body as the poultry body passes thereby;
wherein said first scraping means includes a first scraping blade arranged to guidedly contact the shoulder blade between the meat portion and the shoulder blade, and means for causing the first scraping blade to cooperate with the shoulder blade such that the shoulder blade guides the first scraping blade therealong to detach the meat portion from the shoulder blade under positive contacting control of the first scraping blade by the shoulder blade.

3. An apparatus as claimed in claim 2, wherein the first scraping blade comprises a dove-tail-shaped cutting edge defined by two end points and an arcuate edge connecting the end points, and wherein the first scraping blade is arranged along the conveyor path with the two end points substantially pointing in an upstream direction of said conveyor path.

4. An apparatus as claimed in claim 2, further comprising a second scraping means having a second scraping blade for detaching a meat portion in similar fashion to said first scraping means, said scraping blades being arranged along opposite sides of the conveyor path, and first and second mounting means for respectively spring-mounting the first and second mounting means for respectively spring-mounting the first and second scraping blades for force-resistive guided contact with a passing shoulder blade.

5. An apparatus as claimed in claim 4, wherein each scraping blade has a scraping edge that maintains tangential contact with a shoulder blade during detachment of a meat portion from a shoulder blade.

6. An apparatus as claimed in claim 4, wherein said first and second mounting means further respectively mount said first and second scraping blades to be displaceable in a direction transverse to the conveyor path to maintain guided contact with a shoulder blade.

7. An apparatus as claimed in claim 2, wherein said first scraping blade has a scraping edge that maintains tangential contact with the shoulder blade during detachment of a meat portion from the shoulder blade.

8. An apparatus as claimed in claim 3, wherein said first scraping blade has the dove-tail-shaped cutting edge that maintains tangential contact with the shoulder blade during detachment of a meat portion from the shoulder blade.

* * * * *